Feb. 24, 1970   H. POTTGIESSER ET AL   3,497,139
APPARATUS FOR UNIFORM DISCHARGE OF LIQUID OR
PASTRY FERTILIZERS
Filed April 26, 1968   2 Sheets-Sheet 1
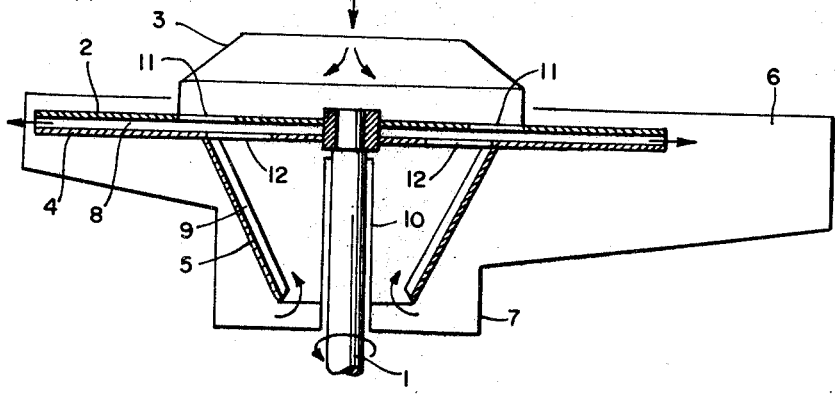
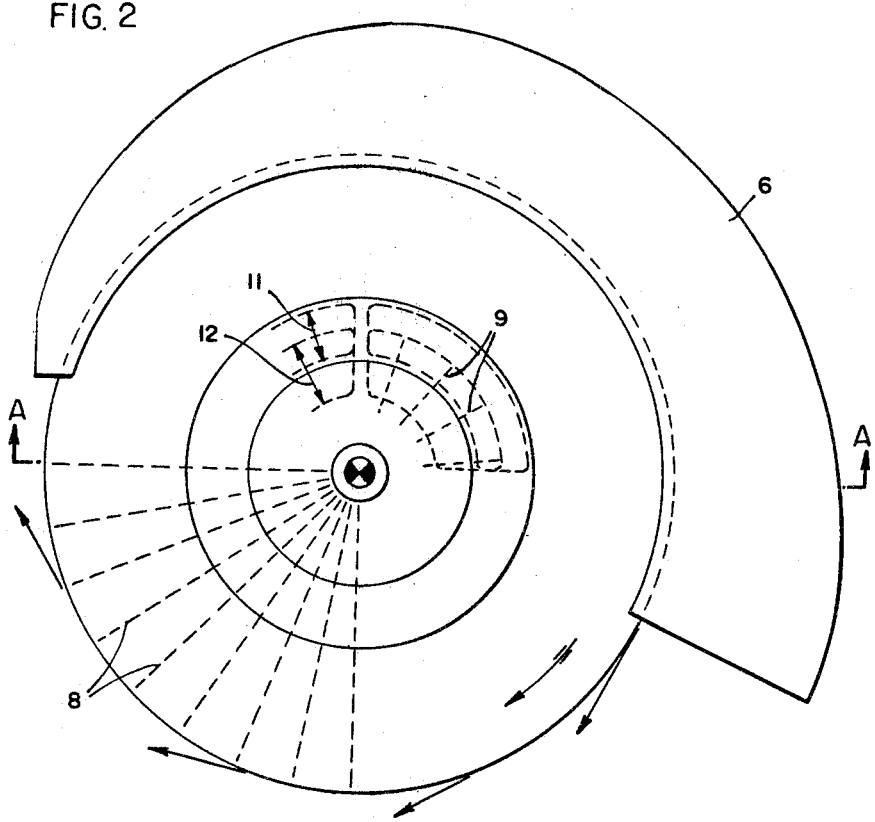
INVENTORS:
HERMANN POTTGIESSER
AUGUST SCHNELL
BY: Marzall, Johnston, Cook & Root
ATT'YS

INVENTORS:
HERMANN POTTGIESSER
AUGUST SCHNELL

United States Patent Office 3,497,139
Patented Feb. 24, 1970

3,497,139
APPARATUS FOR UNIFORM DISCHARGE OF LIQUID OR PASTRY FERTILIZERS
Hermann Pottgiesser and August Schnell, Ludwigshafen am Rhine, Germany, assignors to Badische Anilin- & Soda-Fabrik Aktiengesellschaft, Ludwigshafen am Rhine, Germany
Filed Apr. 26, 1968, Ser. No. 724,541
Claims priority, application Germany, Apr. 29, 1967, B 92,323
Int. Cl. G01f *11/10;* H01c *23/04*
U.S. Cl. 239—223                5 Claims

ABSTRACT OF THE DISCLOSURE

An apparatus for discharging a liquid or a slurry having two coaxial discs arranged in parallel spaced relationship on a vertical driving shaft to provide a cavity therebetween. The upper disc is connected with a receiver for the liquid or slurry and provided with an annular slit in the region of attachment of the receiver. The lower disc is provided with a suction member for withdrawing liquid or slurry from a collecting vessel, into which some of the liquid or slurry is fed by a baffle partly surrounding the discs adjacent to their peripheries, and with an annular slit in the region of attachment of the suction member.

---

Figure 3:
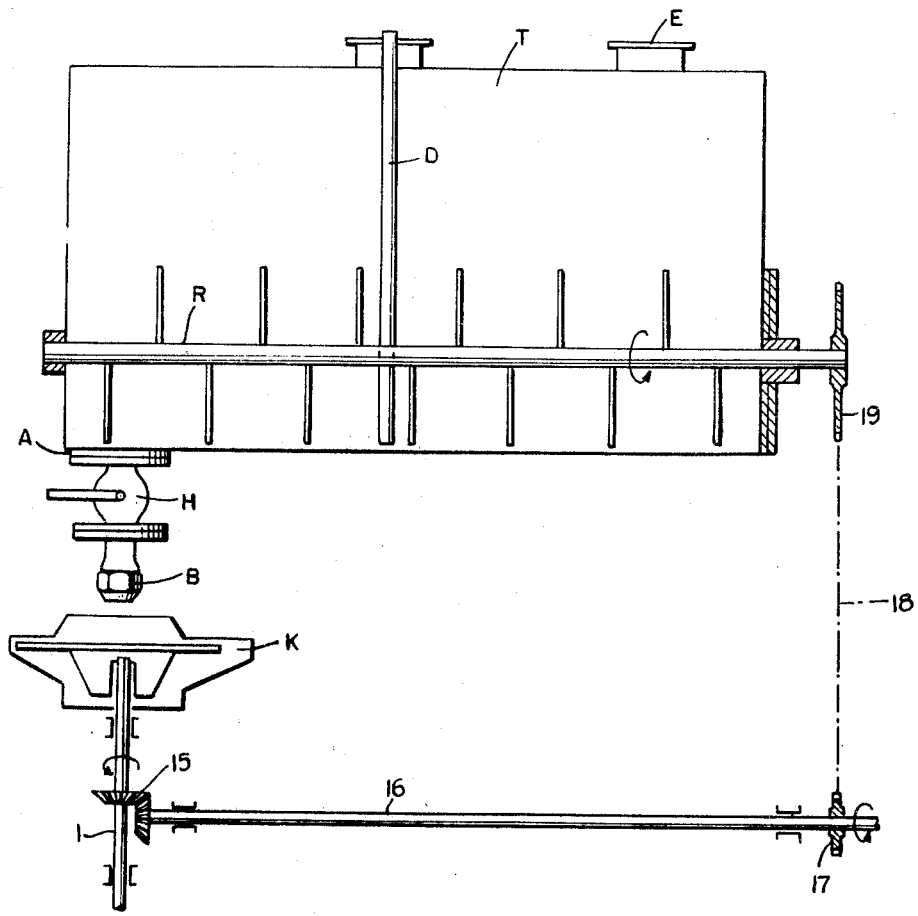

This invention relates to apparatus comprising a centrifugal discharge member for the uniform discharge of liquids or slurries, preferably solutions of fertilizers.

A liquid fertilizer distributor is known which consists of a tank for the fertilizer, a pump which is submersible in the tank and two centrifugal discharge members, the entire distributor being mounted on, or towed by, a vehicle, for example a tractor. The pump circulates the fertilizer in the tank and supplies it through pipelines to the discharge members. These centrifugal discharge members consist of rings of tubes rotating about vertical axes and having large passage openings, which are located a few meters from each other and from the tank. The long supply lines in this known distributor easily tend to become clogged in the case of highly viscous and coarsely dispersed fertilizer suspensions.

An undesirable feature of the above described distributor is that the vehicle on which it is mounted or by which it is towed becomes spattered with liquid fertilizer. To avoid this disadvantage it has already been proposed to arrange the axis of rotation of the, or each, centrifugal member either horizontally or in a position between the horizontal and the vertical. The centrifugal member is partly enclosed by a casing which has adjustable discharge openings for the liquid fertilizer and into which the liquid fertilizer is fed. The fertilizer thrown against the casing collects at the bottom of the casing and is picked up again by the centrifugal member together with the fertilizer freshly fed in and is discharged. A disadvantage of this apparatus is that some of the sprayed drops of liquid are thrown very high and can readily be carried away by the wind.

On the other hand the principle of partly covering the centrifugal discharge member has not hitherto been applied to centrifugal members which rotate about a vertical axis, because the problem of returning the drops of liquid retained by the casing to the centrifugal member for fresh discharge has remained unsolved.

According to the present invention apparatus for discharging a liquid or a slurry, for example a fertilizer solution, comprises two coaxial circular discs arranged in substantially parallel spaced relationship on a substantially vertical driving shaft, to provide a cavity therebetween, a receiver for the liquid or slurry on the upper disc, means for feeding liquid or slurry from the receiver into said cavity, a baffle partly surrounding the discs adjacent to their peripheries for deflecting some of the liquid or slurry issuing from said cavity into a collecting vessel, a suction member on the lower disc for withdrawing liquid or slurry from the collecting vessel, and means for feeding liquid or slurry from the suction member into said cavity.

Radial ribs may be provided on the inner face of the suction member and between the two discs and these serve to guide the liquid or slurry. In one embodiment of the apparatus each disc has an annular slit in the region of attachment of the receiver or the suction member. The baffle may be adjustable in extent and preferably leaves free a discharge opening of at least 140° for the liquid or slurry.

One embodiment of apparatus according to the invention will now be described, by way of example, with reference to the accompanying drawings, in which FIGURE 1 is a cross-section, taken on the line A—A of FIGURE 2, through the discharge member of the apparatus, FIGURE 2 is a plan of the apparatus of FIGURE 1, FIGURE 3 is a diagrammatic view of the entire apparatus.

Referring to FIGURES 1 and 2, the discharge means shown, which is generally designated by the reference letter K, comprises a vertical shaft 1 and a circular disc 2 which is secured to the shaft and has a supply receiver 3 of circular cross-section secured to its upper surface with its longitudinal axis aligned with the axis of shaft 1. A circular disc 4 is secured to the shaft 1 below the disc 2, the disc 4 being spaced axially from and disposed parallel to the disc 2, and having a frusto-conical suction member 5 secured to its lower surface, the longitudinal axis of the member 5 being coaxial with the shaft 1. Thirty-two radial guide ribs 8 are provided between the circular discs 2 and 4, and sixteen radial guide ribs 9 are provided on the inner wall of the suction member 5. Annular slits 11 and 12 for the passage of the fertilizer solution are provided in the discs 2 and 4, respectively, in those parts of the discs covered by, and close to the wall of, the receiver 3 and the member 5, respectively. The discharge means is partly surrounded by a rebound baffle 6 and a collecting vessel 7. The collecting vessel 7 comprises a tubular channel 10 for the passage of the shaft 1.

The fertilizer solution to be sprayed is situated in a tank T (see FIGURE 3) having an inlet opening E, an outlet opening A, a pressure-equalizing pipe D and a stirring means R. At the outlet A there are provided a shut-off valve H, a metering orifice B and the discharge means K shown in FIGURES 1 and 2. The shaft 1 of the discharge means K is connected to the power take-off (not shown) of a tractor and the stirring means R is driven from the shaft 1 by a transmission mechanism comprising bevel gears 15, a shaft 16, a sprocket 17, a chain 18 and a sprocket 19.

After the tank T has been filled with fertilizer solution, the inlet opening E is hermetically closed so that the contents of the tank are only in communication with the atmosphere through the pipe D which extends almost to the bottom of the tank. After the valve H has been opened, the outflow rate of the fertilizer solution depends only on the difference in head between the lower end of the pressure-equalizing pipe D and the lower end of the metering orifice B and is thus independent of the level of the liquid in the tank T. The maintenance of this constant outflow rate of the fertilizer solution throughout the whole spraying process results in a completely uniform distribution of fertilizer on the ground.

The fertilizer solution issuing from the metering orifice B then passes to the receiver 3 of the discharge member K and passes through the annular slits 11 into the cavity between the circular discs 2 and 4. Due to the centrifugal acceleration imparted to it by the rotating circular discs, the fertilizer solution is conveyed radially outwardly between the two circular discs 2 and 4 and thrown out at the peripheral edge of the discs. The rebound baffle 6 which leaves only a certain adjustable portion of the periphery of the centrifugal discharge member K free for spraying, protects the tractor on which the discharge member is mounted from being spattered with fertilizer solution. The fertilizer solution which is thrown against the rebound baffle 6 drains into the collecting vessel 7, whence it is conveyed by the pump action of the rotating suction member 5 to the circular disc 4 and passes through the annular slits 12 into the cavity between the circular discs 2 and 4. This fertilizer solution is then discharged once again together with fresh fertilizer solution entering through the annular slit 11. The guide ribs 8 and 9 guide the fertilizer solution on its way through the centrifugal discharge member and assist in ensuring a uniform discharge.

The most favorable peripheral speed of the centrifugal discharge member for uniform distribution of the fertilizer solution is determined by experiment; it is between 10 and 17 meters per second and is dependent on the nature of the fertilizer solution to be discharged, particularly on its viscosity. When the peripheral speed is too low, the width of scattering by the centrifugal discharge member is too small and the distribution of the fertilizer solution is unsatisfactory. As the peripheral speed is increased, the width of scattering at first increases and reaches a maximum (again depending on the nature of the fertilizer solution) at a peripheral speed of the centrifugal discharge member of from 20 to 30 meters per second. At the same time, however, the drops of liquid sprayed out become so small with increasing peripheral speed that they can be carried away too easily by the wind. The most favorable dimensions for the centrifugal discharge member are demonstrated by the following numerical example.

EXAMPLE

For a given fertilizer solution, the peripheral speed $v$ of the centrifugal discharge member is chosen to be 13 meters per second. The discharge member is driven directly by the power take-off shaft of a tractor. The speed of rotation $\omega$ of the tractor power take-off shaft has a substantially uniform value of 540 r.p.m. at full throttle in all gear ratios of the tractor. From the equation $$v=\frac{\pi\cdot\omega\cdot d}{60}$$

where $d$ is the diameter of the discs of the centrifugal discharge member, we obtain $$d=\frac{v\cdot 60}{\pi\cdot\omega}=0.46 \text{ meter}$$

At a distance from the ground of the centrifugal discharge member of 0.80 to 0.90 meter, a width of spread of about 8 meters is achieved with this arrangement. If possible, the distance from the ground of the centrifugal discharge member should not be more than 1 meter, because otherwise the effect of the wind on the drops of liquid is too great.

The advantage of the equipment according to the invention over prior art fertilizer spreaders consists in the fact that liquid or slurry fertilizers and plant protection agents, including coarsely dispersed suspensions, can be discharged without the risk of stoppages, with a substantially constant supply rate and substantially uniform surface distribution.

We claim:

1. Apparatus for spraying a liquid or liquid slurry which comprises a rotatable, vertical drive shaft, a pair of substantially horizontal discs mounted on said shaft for rotation therewith and axially spaced on said shaft to provide an annular space therebetween, a plurality of substantially radial ribs in said space and rotatable with said discs, a hollow liquid-receiver mounted on the upper face of the upper disc, said receiver having a central opening in the upper wall thereof for feeding liquid to said receiver, and said upper disc having liquid passage means therethrough near but radially inside the periphery of said receiver for conveying liquid from the peripheral area of said receiver into said space while said discs are rotating.

2. Apparatus for spraying a liquid or liquid slurry which comprises a rotatable, vertical drive shaft, a pair of substantially horizontal discs mounted on said shaft for rotation therewith and axially spaced on said shaft to provide an annular space therebetween, a plurality of substantially radial ribs in said space and rotatable with said discs, a hollow, frusto-conical, downwardly tapering wall depending coaxially from the lower face of the lower disc and defining a frusto-conical suction zone, a plurality of vertical ribs on the frusto-conical inner face of said frusto-conical wall, vessel means for intercepting and collecting a portion of the liquid or liquid slurry discharged from the periphery of the space between the rotating discs and including a liquid-collection portion adjacent the lower end of said frusto-conical wall, and said lower disc having passage means for flow of liquid impelled by said frusto-conical wall and the ribs thereon upwardly and outwardly from said liquid collection portion into the space between said discs.

3. Apparatus as claimed in claim 2 wherein said vessel means includes an arcuate baffle extending about a portion of the periphery of said discs, the remaining portion of said periphery of said discs being free to the extent of providing an unintercepted liquid spray therefrom over the arcuate range of at least 140°.

4. Apparatus as claimed in claim 1 wherein the periphery of the space between said discs is, with the exception of said substantially radial ribs, free from obstructions.

5. Apparatus as claimed in claim 2 wherein the periphery of the space between said discs is, with the exception of said substantially radial ribs, free from obstructions.

References Cited

UNITED STATES PATENTS

| | | | |
|---|---|---|---|
| 1,488,356 | 3/1924 | Linke | 239—222 X |
| 1,731,515 | 10/1929 | Andrews et al. | 302—36 |
| 1,937,040 | 11/1933 | Vogel-Jorgensen | 302—36 |
| 2,835,537 | 5/1958 | Davis | 302—36 |
| 3,103,311 | 9/1963 | Kempf | 239—222 X |
| 3,288,052 | 11/1966 | Hough | 239—223 |

SAMUEL F. COLEMAN, Primary Examiner

NORMAN L. STACK, Jr., Assistant Examiner

U.S. Cl. X.R.

222—410

PO-1050 (5/69)

UNITED STATES PATENT OFFICE
CERTIFICATE OF CORRECTION

Patent No. 3,497,139          Dated February 24, 1970

Inventor(s) Hermann Pottgiesser et al

It is certified that error appears in the above-identified patent and that said Letters Patent are hereby corrected as shown below:

Column 1, line 3, in the title, "PASTRY" should read --PASTY--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents